United States Patent Office 2,914,916
Patented Dec. 1, 1959

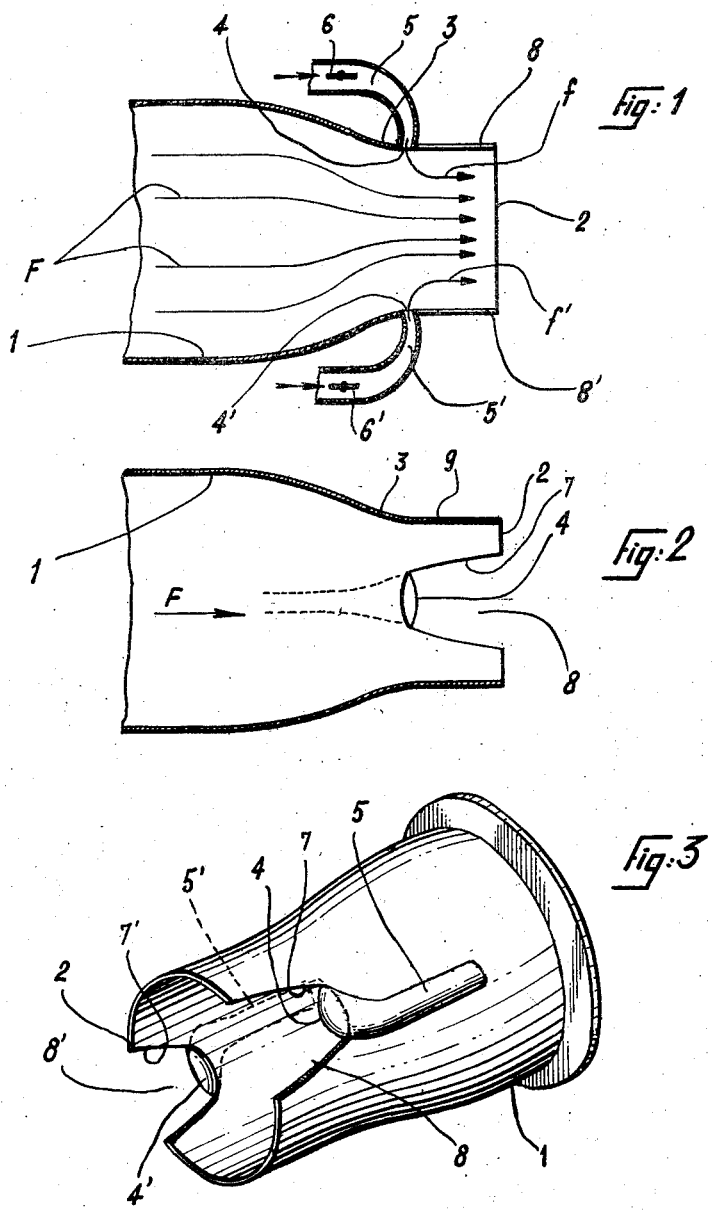

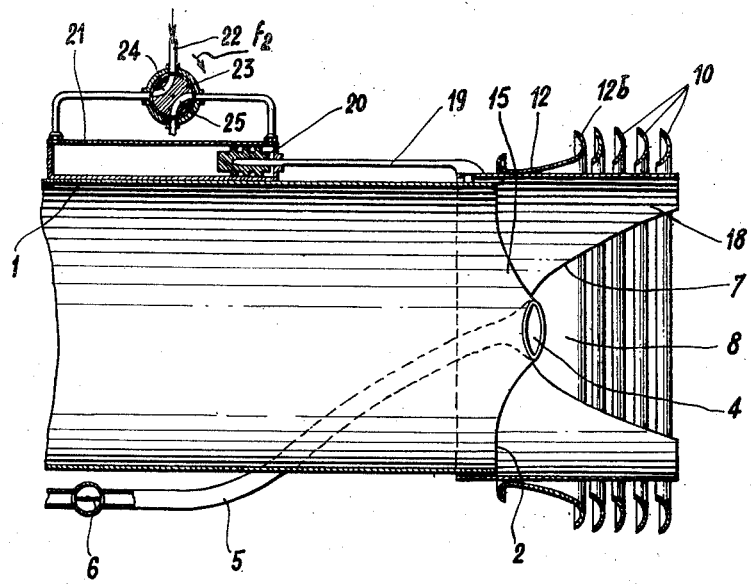

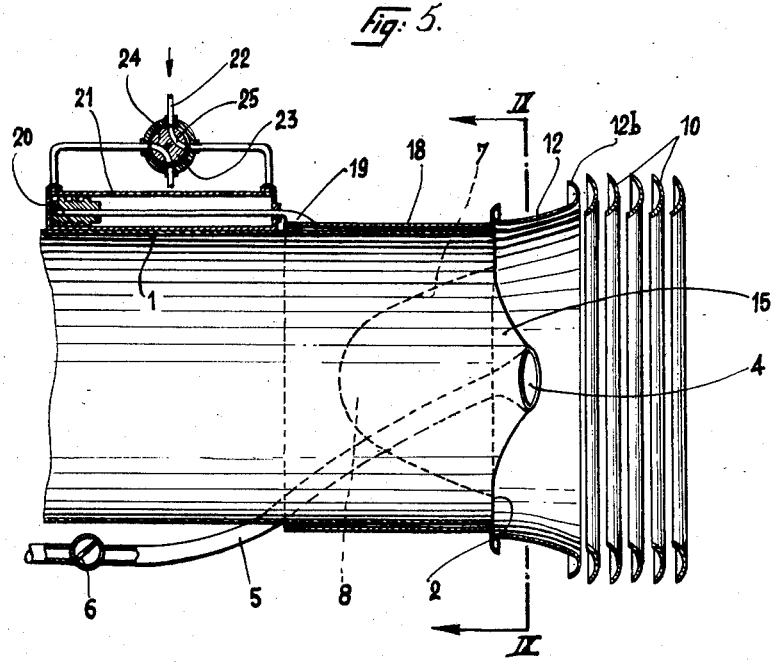
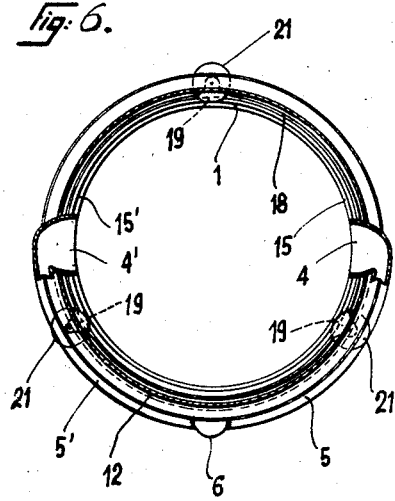

2,914,916

ARRANGEMENT FOR CONTROLLING THE FLOW OF A FLUID BY MEANS OF AN AUXILIARY FLOW

Paul Gelin, Neuilly-sur-Seine, and Marcel Kadosch, Paris, France, assignors to Societe Nationale d'Etude et de Construction de Moteurs d'Aviation, Paris, France, a French company Application December 9, 1953, Serial No. 397,233

Claims priority, application France December 12, 1952

2 Claims. (Cl. 60—35.54)

The present invention has for its object to provide an arrangement for controlling the flow of a fluid by means of a flow of auxiliary fluid at a suitable pressure, this arrangement being capable of use either to vary by means of gaseous constriction the cross-section of the passage available for the main flow in the tube through which the said flow passes, or to cause the main flow to deviate momentarily from its normal direction.

The arrangement includes at least two injectors or nozzles from which the auxiliary fluid may be discharged into the tube at two different parts of a transverse section, through orifices the length of which, at the transverse section, is a fraction of the periphery of the tube.

The jets discharged from these orifices are equivalent to physical obstacles and by suitable choice of the shape of the orifices as well as by arrangements by means of which the zone of depression or wake zone, which tends to be formed aft of the said obstacles, may be supplied with fluid, there may be given to the wake a divergence form which does not re-close on itself aft of the obstacle, and this feature is favorable to the control of the cross-sectional area of passage presented by the tube to the main flow, or to the deflection of that flow.

The most simple form of embodiment is that in which there are provided two injectors or nozzles discharging into the tube through orifices which are located opposite to each other. In this case, the two diametrically-opposed jets of auxiliary fluid discharged from the said orifices have an action equivalent to that of a solid obstacle which would be arranged diametrically, while at the same time they result in simpler installation which is easier to operate.

The natural corollary of this form of embodiment is that in which there would be provided two or more pairs of injectors or nozzles, the orifices of the injectors being arranged oppositely for each pair, but there may also be any particular number of injectors distributed around the periphery of the tube.

In the case in which it is desired to control, by means of such an arrangement, the cross-sectional area of passage presented by the tube or pipe to the main flow, the auxiliary fluid discharged from the various injectors, or only from some of them, with a component of speed at right angles to the direction of flow of the main jet, acts so as to reduce the cross-section of passage available to that jet, the constriction being a function of the momentum of the auxiliary fluid, that is to say of its quantity discharged as well as its initial pressure and temperature which determine its speed. The fact that the auxiliary fluid is discharged into the pipe through orifices which are separated by unbroken portions of the wall of the pipe, enables this wall to be arranged in the best way for satisfying various conditions.

In the case in which it is desired to apply the arrangement to the deflection of the main jet with respect to its normal direction, the auxiliary jets are put into operation at the moment at which it is desired to make the deflection, either simultaneously or separately, so that the main jet which is forced to one side into the zones of the auxiliary jets is subjected to a kind of radial distortion, in consequence of which it comes in contact with members which guide it towards a deflected direction, the said members being placed in such a way as to be outside the main jet when it follows its normal course.

In the accompanying drawings:

Figures 1 and 2 are longitudinal sections taken along two perpendicular planes through the axis of the discharge nozzle of a jet propulsion unit equipped with a nozzle area varying system.

Fig. 3 is a view in perspective of the same discharge-nozzle.

Figures 4 and 5 are longitudinal sections of a form of embodiment which enables either the control of the cross-sectional area available for the main jet, or the deflection of that jet, to be effected at will. The figures show a half-section, in the axial plane, of a reaction discharge-nozzle in two different positions of operation.

Fig. 6 is a partial cross-section along the line IX—IX of Fig. 5.

In the form of embodiment shown in Figs. 1 and 2, there is shown at 1 the exhaust nozzle of a reaction propulsion-unit which receives a flow of hot gas from a source, not shown and situated to the left, and expands these gases to form a high-speed jet which is discharged to the atmosphere through the orifice 2 of the discharge-nozzle. Immediately aft of the neck 3 of the discharge-nozzle, two tubes 5, 5′, discharge into the latter through two orifices 4, 4′, diametrically opposite each other, the tubes being connected to a source of fluid at a suitable pressure, in such a way that the total pressure of this fluid at its entry into the discharge-nozzle through the orifices 4, 4′, is higher than the static pressure, at these same points, of the gases flowing inside the discharge-nozzle. This source may be for example, the air compressor in the case of a turbo-jet unit, or again the combustion chambers preceding the turbine, in which case there is obtained the advantage of having an auxiliary fluid possessing very great energy. If, furthermore, there is employed as the auxiliary fluid the air derived from the delivery side of the compressor, it may be heated, for example by causing it to pass through a special combustion chamber, before it is led to the tubes 5, 5′. These tubes are provided with valves 6, 6′ by means of which the output of auxiliary fluid may be regulated between zero and a maximum value. The orifices 4, 4′ are given an elongated shape in the sense of the periphery of the discharge-nozzle as is shown in Fig. 2.

When the valves 6, 6′ are closed, the discharge-nozzle presents its full cross-sectional area of passage to the gases.

When, on the other hand, the valves 6, 6′ are opened (which is the case illustrated in Fig. 1), the auxiliary fluid passing into the discharge-nozzle through the orifices 4, 4′ with a component of speed at right angles to the direction of flow of the gases, forms inside the discharge-nozzle, two opposite screens which divert the gases away from the wall of the discharge-nozzle. The gases are thus compressed between the two layers of auxiliary fluid flowing along the lines indicated by the arrows $f$, $f'$, and the cross-section of passage available to the gases is thereby diminished.

The discharge-nozzle extends aft of the orifices 4, 4′, in the form of a skirt 9, which may, for example, be cylindrical and which prevents the main jet, which has been compressed along a diameter, from expanding and spreading out along the diameter at right angles to that referred to.

As the effect of the gaseous constriction arrangement is much better than the obstacles created by the screens of auxiliary gas passing out of the orifices 4, 4', giving rise to a more pronounced wake in the main jet and since this wake does not re-close, at least within the interior of the discharge-nozzle, the two following special features are employed: firstly, the orifices 4, 4' are shaped so as to give auxiliary jets which are equivalent in effect to a physical obstacle which is as badly streamlined as possible, these orifices having preferably (see Fig. 2) a distended shape in the middle and coming to a point or to a small radius of curvature at each extremity; secondly, the zone of low pressure constituting the wake is supplied with fluid (with atmospheric air) by means of the indentations 8, 8', formed in the skirt 9 aft of the orifices 4, 4', and having preferably a profile which follows the lines of intersection 7, 7', of the wake zone with the surface of the skirt.

The number of auxiliary jets may, of course, be different from the two shown.

It should be noted that the angle which is made by the axes of the auxiliary jets injected through the orifices 4, 4', with the axis of the main jet may be adapted in the best way possible to the desired result, and the auxiliary jets may be directed just as well towards the forward side, as shown in Fig. 1, as towards the rear.

As, in general, it will be desired to obtain the greatest possible penetration of the auxiliary jets into the main jet, it may be estimated, by analogy with the properties of the parabolas of projectiles, that the most favorable angle is in the neighborhood of 45° towards the front. But, depending on the individual case, good results may be obtained with values which differ from that angle. This remark is also valid for the various forms of embodiment of the invention, whether it is a question of injections of auxiliary fluid which are intended to vary the cross-sectional area of passage presented to the main jet, or of injections which are made for the purpose of deflecting the auxiliary jet, as will be described below.

In the form of embodiment shown in Figs. 4 to 6, the same nozzles for the injection of auxiliary fluid may be used either for reducing the cross-sectional area of passage in the discharge-nozzle without deflection of the jet passing out of the latter, or for the deflection of that jet. Each of the nozzles 4, 4', through which the auxiliary fluid, which is conveyed to them through a pipe 5, 5' with a common valve 6, can be discharged into the discharge-nozzle, is provided at the extremity of a projecting portion 15, 15', of the free edge of the discharge-nozzle. Around this free edge and spaced at a certain distance therefrom, there is arranged a convex annular surface 12 which is intended to receive and guide the marginal layer of the jet expelled from the discharge-nozzle, during the period of deflection, the said surface, suitably curved towards the front, as shown at 12b, being followed by a grid of blades 10, curved in a similar way.

A cylindrical tube 18, having a diameter a little larger than that of the discharge-nozzle, is slidably mounted around the latter, its movement being controlled by arms 19 attached to pneumatic pistons 20 moving inside fixed cylinders 21. The tube 18 may thus occupy either the one or the other of the positions shown respectively in Figs. 4 and 5.

The position shown in Fig. 4 is that which corresponds to the normal operation of the discharge-nozzle having the possibility of controlling, by gaseous constriction, the cross-sectional area of passage presented to the gases by this discharge-nozzle.

In this position, the tube extends the discharge-nozzle by passing through the space left between the convex surface 12 and the extremity of the discharge-nozzle. Aft of the orifices 4, 4', the tube is provided with indentations 8, 8', having the same profile and the same function described with respect to Figs. 1 to 3. If the valve 6 is closed, the full section of the discharge-nozzle is available to the passage of the gases for the formation of the propulsive jet. If the valve 6 is opened, the auxiliary jets discharged from the orifices 4, 4', reduce the cross-section of passage by forming a wake which is supplied through the indentations 8, 8'.

If now the tube is moved into the position shown in Fig. 5, the surface 12 and the grid of blades are completely uncovered and the arrangement enables deflection of the jet to be carried out. For this purpose, it is sufficient to supply fluid to the orifices 4, 4' by opening the valve 6.

The cylinders 21 which effect the movement of the tube, may be supplied with compressed air derived permanently from the compressor of the reaction unit through a pipe 22. This pipe terminates at the fixed portion 23 of a valve, the rotating portion of which is provided with two channels 24, 25, which control respectively the supply and the exhaust at the extremities of the cylinders such as 21. In the position of the valve shown in Fig. 4, the channel 24 admits the compressed air to the left-hand extremities of the cylinders. On the other hand, the port 25 connects the right-hand extremities of these cylinders to exhaust, the pistons thus keeping the tube 18 in the position of normal operation of the discharge-nozzle.

In order to put the members into the position suitable for carrying out the deflection of the jet, the movable portion 23 of the valve must be rotated through 90° in the direction of the arrow $f_2$ (Fig. 4), so that the channel 24 supplies the right-hand extremities of the cylinders 21, the channel 25 connecting the opposite extremities to the atmosphere.

What we claim is:

1. In a jet propulsion unit ending with a propulsive nozzle of circular cross-section designed to expand a stream of motive gas to form a thrust-producing jet, a jet control device comprising two diametrically-opposite nozzles extending along minor portions of the periphery of said propulsive nozzle and opening towards the interior thereof, said auxiliary nozzles substantially facing each other and having an elongated shape perpendicular to the flow of said stream, controllable means for supplying both said auxiliary nozzles with pressure fluid whereby auxiliary jets issue therefrom and project transversely into said stream to form thereacross a diametrical partial obstruction to the flow thereof, and a wall extension of said propulsive nozzle projecting downstream of said auxiliary nozzles to prevent deflection of said thrust-producing jet in a direction perpendicular to said diametrical obstruction and having passage means formed therethrough for introducing ambient air behind said obstruction, said wall extension being slidable relatively to the propulsive nozzle, parallel to the axis thereof, to be retracted from the projecting position, whereby the thrust-producing jet is deflected in said direction.

2. Device as claimed in claim 1, comprising further jet deflecting means extending around the normal undeflected path of the thrust-producing jet and exposed to said jet when the wall extension is retracted from its projected position, whereby the deflected jet engages said means and is further deflected thereby.

References Cited in the file of this patent

UNITED STATES PATENTS

| | | |
|---|---|---|
| 2,213,121 | Davy | Aug. 27, 1940 |
| 2,329,177 | Baker | Sept. 14, 1943 |
| 2,692,800 | Nichols et al. | Oct. 24, 1954 |
| 2,702,986 | Kadosch et al. | Mar. 1, 1955 |

FOREIGN PATENTS

| | | |
|---|---|---|
| 344,748 | France | Sept. 14, 1904 |
| 1,020,287 | France | Nov. 12, 1952 |